(12) United States Patent
Park et al.

(10) Patent No.: US 8,891,892 B2
(45) Date of Patent: Nov. 18, 2014

(54) IMAGE ENCODING METHOD USING ADAPTIVE PREPROCESSING SCHEME

(71) Applicant: Electronics and Telecommunications Research Institute, Daejeon (KR)

(72) Inventors: Noh-Sam Park, Daejeon (KR); Sang Wook Park, Chungcheongnam-do (KR); Eun Jin Ko, Daejeon (KR); Hyun Chul Kang, Daejeon (KR); Mi Kyong Han, Daejeon (KR); Jong Hyun Jang, Daejeon (KR); Kwang Roh Park, Daejeon (KR)

(73) Assignee: Electronics and Teleommunications Research Institute, Daejeon (KR)

( * ) Notice: Subject to any disclaimer, the term of this patent is extended or adjusted under 35 U.S.C. 154(b) by 121 days.

(21) Appl. No.: 13/743,630

(22) Filed: Jan. 17, 2013

(65) Prior Publication Data
US 2013/0251279 A1 Sep. 26, 2013

(30) Foreign Application Priority Data

Mar. 26, 2012 (KR) .......................... 10-2012-0030819

(51) Int. Cl.
*G06K 9/36* (2006.01)
*G06K 9/46* (2006.01)
*G06T 9/00* (2006.01)

(52) U.S. Cl.
CPC ....................................... *G06T 9/004* (2013.01)

USPC .......................................................... 382/238

(58) Field of Classification Search
None
See application file for complete search history.

(56) References Cited

U.S. PATENT DOCUMENTS

| | | | |
|---|---|---|---|
| 6,301,301 B1 * | 10/2001 | Isu et al. ................... | 375/240.14 |
| 6,625,319 B1 * | 9/2003 | Krishnamachari ........... | 382/238 |
| 6,633,611 B2 * | 10/2003 | Sekiguchi et al. ........ | 375/240.16 |
| 7,697,610 B2 * | 4/2010 | Yu et al. ................... | 375/240.16 |
| 8,270,490 B2 * | 9/2012 | Sakamoto et al. ........ | 375/240.16 |
| 2008/0152021 A1 | 6/2008 | Babonneau et al. | |

FOREIGN PATENT DOCUMENTS

WO 2011/065761 A2 6/2011

* cited by examiner

*Primary Examiner* — Bhavesh Mehta
*Assistant Examiner* — Feng Niu
(74) *Attorney, Agent, or Firm* — Ladas & Parry LLP (57) ABSTRACT

The present invention relates to an image encoding method using an adaptive preprocessing scheme, including loading an input image for each frame, determining an encoding type of each of the frames, determining the size of a block to be encoded in each frame according to the determined encoding type, determining blocks that can be replicated from the blocks having the determined size and performing an intra-picture replication preprocessing or inter-picture replication preprocessing procedure on the determined blocks according to the encoding types of the frames, and encoding the frames on which the preprocessing procedure has been performed.

11 Claims, 6 Drawing Sheets

ORIGINAL FRAME (I)

IMAGE ENCODING METHOD USING ADAPTIVE PREPROCESSING SCHEME

CROSS-REFERENCES TO RELATED APPLICATIONS

The present application claims priority under 35 U.S.C. 119(a) to Korean Application No. 10-2012-0030819, filed on Mar. 26, 2012, in the Korean Intellectual Property Office, which is incorporated herein by reference in its entirety set forth in full.

BACKGROUND

Exemplary embodiments of the present invention relate to an image encoding method, and more particularly, to an image encoding method using an adaptive preprocessing scheme, which compares an original image with the blocks of a reference image, encodes an image by replicating blocks having similarity within a threshold, and controls the threshold so that the picture quality of the encoded image remains within a specific range.

In order to transfer digital video from a source (e.g., a camera or stored video) to a destination (e.g., a player), core processes called compression (encoding) and restoration (decoding) are necessary. Through the processes, 'original' digital video that becomes a load of a bandwidth is compressed into a size that is easy to handle for transmission or storage and then restored again for display.

For the compression and restoration processes, the international standard ISO/IEC 13818, also known as MPEG-2, has been established for the digital video industries, such as digital TV broadcasting and DVD-video, and two compression standards: MPEG-4 Visual and H.264 have been developed in anticipation of the demands for an excellent compression tool. The H.264 standard, that is, a video compression technology standard established by ITU-T, is also called Moving Picture Experts Group-Phase 4 Advanced Video Coding (MPEG-4 AVC). The two compression standards have been subjected to the same creation process, and they have some common characteristics, but have different targets.

In general, an image encoding apparatus has been developed very effectively as the temporal or spatial entropy of an image to be encoded is reduced. The image encoding apparatus utilizes an image preprocessing scheme for processing an image so that better encoding is possible.

In an image preprocessing scheme for reducing the entropy of an image sequence, filtering and noise detection are used in order to remove pieces of noise distributed within an image. Representative examples for removing noise include a radiation correction scheme for reducing a radiation error occurring because the pixel value of an image is different from the radiation value of a real image and a geometric correction scheme for correcting the spatial distortion of an image having a twisted form.

In image compression, an object of image preprocessing is to reduce the amount of data of an image through a mathematical operation in order to increase efficiency and reduce a storage space when images are transmitted and received. Accordingly, in image compression intra-mode, a linear or non-linear filter for reducing or even removing high frequency components that account for most of image encoding costs is used.

A conventional technique, such as filtering for reducing the high frequency components, is problematic in that distortion is generated in an original image because a filter is used and thus a residual image is increased in an image compression process, thereby deteriorating compression efficiency.

A background technology of the present invention is disclosed in Korean Patent Laid-Open Publication No. 10-2011-0014507 (Feb. 11, 2011).

SUMMARY

An embodiment of the present invention relates to an image encoding method using an adaptive preprocessing scheme, which is capable of suppressing the distortion of an original image that may occur when a filter is used and of suppressing the deterioration of compression efficiency in an image compression process.

In one embodiment, an image encoding method using an adaptive preprocessing scheme includes loading an input image for each frame; determining an encoding type of each of the frames; determining a size of a block to be encoded in each frame according to the determined encoding type; determining blocks that can be replicated from the blocks having the determined size and performing an intra-picture replication preprocessing or inter-picture replication preprocessing procedure on the determined blocks according to the encoding types of the frames; and encoding the frames on which the preprocessing procedure has been performed.

In the present invention, the input image preferably has a YUV form.

In the present invention, the encoding type preferably is any one of an I frame, a P frame, and a B frame.

In the present invention, the determining of a size of a block to be encoded in each frame depending on the determined encoding type preferably includes a first process of comparing a Sum of Squared Error (SSE) value, calculated from the size of a first block, with a preset threshold; a second process of, if, as a result of the comparison, a minimum SSE value of the first block is greater than the preset threshold, comparing a minimum SSE value, obtained by splitting the size of the first block by half horizontally or vertically, with the preset threshold; a third process of, if, as a result of the comparison in the second process, a minimum SSE value of the split block is greater than the preset threshold, comparing a minimum SSE value, obtained by splitting a size of the split block by half horizontally or vertically, with the preset threshold; and a fourth process of performing the first to third processes repeatedly until a minimum SSE value of the split block is smaller than the preset threshold or the size of the block becomes a minimum size of a block that can be split.

In the present invention, a minimum size of the block preferably is 8×8.

In the present invention, the replication preprocessing procedure preferably includes calculating SSE values from all macro blocks within the frame to be encoded when the frame is an I frame and replicating a corresponding reference block value to an original block when a minimum SSE value of the calculated SSE values is smaller than a preset SSE threshold.

In the present invention, the replication preprocessing procedure preferably includes calculating SSE values by comparing each macro block with all macro blocks within a reference frame when the frame to be encoded is a P or B frame and replicating a block value of the reference frame to an original block when an SSE value of a block having a minimum SSE value, from among all the macro blocks of the reference frame, is smaller than a preset SSE threshold.

In the present invention, the image encoding method further includes restoring the encoded frames and evaluating the quality of the restored frames and upward or downward controlling a threshold that is a criterion for determining blocks to be replicated based on the evaluated quality.

In the present invention, the evaluating of the quality of the restored frames preferably includes evaluating whether the quality of the restored frames satisfies target quality of an encoder based on a result of a calculated Peak Signal-to-Noise Ratio (PSNR) and the bit rate of the encoded frame.

In the present invention, the upward or downward controlling of a threshold that is a criterion for determining blocks to be replicated based on the evaluated quality preferably includes upward controlling the threshold when the quality of the restored frames is lower than the target quality and maintaining the threshold or downward controlling the threshold within a specific range when the quality of the restored frames satisfies the target quality.

In the present invention, the SSE value preferably is calculated by Equation below $$D_{b_i}(u, v) = \sum_{(x,y) \in b_i} (F_c(x, y) - F_R(x+u, y+v))^2,$$

wherein bi is the block of a current frame, Fc(x,y) is a pixel value at a current frame (x,y) position, $F_R$(x,y) is a pixel value at a reference frame (x,y) position, and u and v are motion vector values.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Hereinafter, embodiments of the present invention will be described with reference to accompanying drawings. However, the embodiments are for illustrative purposes only and are not intended to limit the scope of the invention.

In general, there are three types of pictures: an Intra-picture (I picture) (or I frame), a Predictive-picture (P picture) (or P frame), and a Bi-directional predictive-Picture (B picture) (or B frame) in coding methods, such as MPEG-1/2/4 and H.264.

The I picture is a picture obtained by independent coding from an intra-picture irrespective of before and after pictures. That is, in the I picture, coding processing can be performed using only intra-picture information without applying motion prediction in the time direction.

The P picture is a picture obtained by prediction coding in the forward direction between pictures. That is, in the P picture, coding processing is performed using an I picture or a P picture as prediction images in inter-picture prediction.

Furthermore, the B picture is a picture obtained by prediction coding from both directions in the past and future. That is, in the B picture, bi-directional prediction using macro blocks that exist in the past, future, or both directions rather than a corresponding frame in the time axis is performed using an I picture or a P picture as prediction images.

Meanwhile, hybrid coding, that is, the standard structure of recent image compression coding, is a method of performing compression encoding by combining the removal of temporal information redundancy for removing redundant information between the pictures of an image and the removal of spatial information redundancy or removing redundant information within an intra-picture spatial pixel. That is, in the hybrid coding method, the information redundancy of moving image information in the time direction is removed using motion compensation and inter-frame prediction, and information redundancy in the space direction (i.e., within a picture) that remains in prediction errors is removed using a Discrete Cosine Transform (DCT).

Furthermore, preprocessing means a task of preparing an image to be subject to compression encoding in order to facilitate compression coding processing through the transform of a format, a change of order of frames, and noise removal processing. That is, specific noise included in an input image is reduced by performing filtering processing because it deteriorates compression performance. In general, when removing redundant information in an image, the redundant information is removed and some distortion is also permitted in order to realize high compression efficiency.

Furthermore, the DCT means mathematical processing for transforming an expression of a pixel region into an expression of a frequency region.

The results of image coding are represented by a coding stream of binary values. The coding stream is transmitted and restored into an original image through decoding.

An image encoding apparatus and method using an adaptive preprocessing scheme in accordance with some embodiments of the present invention are described in detail below with reference to the accompanying drawings.

Figure 1:
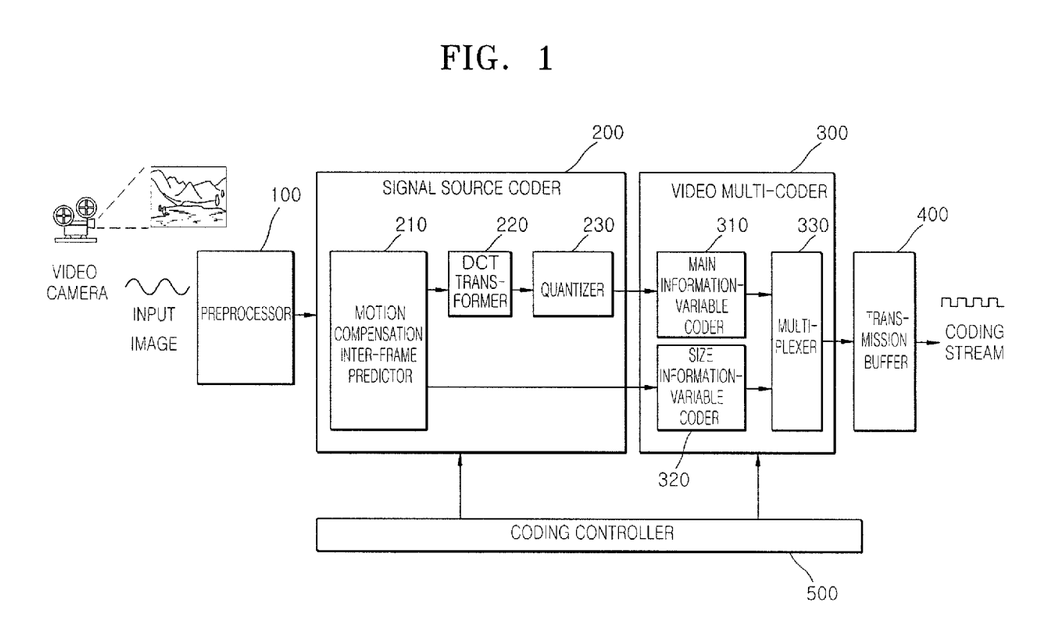
FIG. 1 is an exemplary diagram showing the construction of an image encoding apparatus using a hybrid coding method which is related to the present invention.

FIG. 1 is an exemplary diagram showing the construction of an image encoding apparatus using a hybrid coding method which is related to the present invention.

As shown in FIG. 1, the image encoding apparatus using a hybrid coding method includes a preprocessor 100, a signal source coder 200, a video multi-coder 300, a transmission buffer 400, and a coding controller 500. The signal source coder 200 includes a motion compensation inter-frame predictor 210 for performing motion compensation and motion estimation, a DCT transformer 220 for performing a DCT, and a quantizer 230 for performing a quantization task. Furthermore, the video multi-coder 300 includes a main information-variable coder 310, a size information-variable coder 320, and a multiplexer 330.

The preprocessor 100 converts an input image signal into a signal of a digital format using a time space filter (not shown) and performs filtering for removing noise in advance.

The signal source coder 200 quantizes a signal, obtained after removing information included in the input image signal using the motion compensation inter-frame predictor 210 and the DCT transformer 220, within a specific error range using the quantizer 230. Here, the motion compensation is to detect the motion of a subject and produce an effective prediction picture as a result of the detection, and the inter-frame prediction is a coding method of producing a prediction picture from reference frames in front, rear, or both directions of an original frame to be coded.

The video multi-coder 300 converts main information on image compression coding and supplementary information, such as the attributes of a block, which are composed of DCT coefficient values into coding streams each having a predetermined data structure using the respective variable coders 310 and 320, multiplexes the coding streams using the multiplexer 330, and outputs the multiplexed streams. Here, the main information displays a prediction error within the processing results of the signal source coder 200, and the supplementary information displays a motion compensation vector value, a coding method, and coding mode other than the main information.

The transmission buffer 400 temporally stores a compressed image and controls the amount of generated information that varies over time at a specific speed based on the speed of a transmission line. That is, coding streams according to the results of image coding are controlled so that they do not overflow or underflow when the coding streams are transmitted using a communication line.

The coding controller 500 determines the type of elements of an encoding algorithm, such as a Quantization Parameter (QP) size, which is necessary to produce a bit stream of constant quality. That is, the coding controller 500 processes the amount of generated information so that it becomes close to a target value by selecting a coding method or parameters in a frame or smaller unit for an image.

Figure 2:
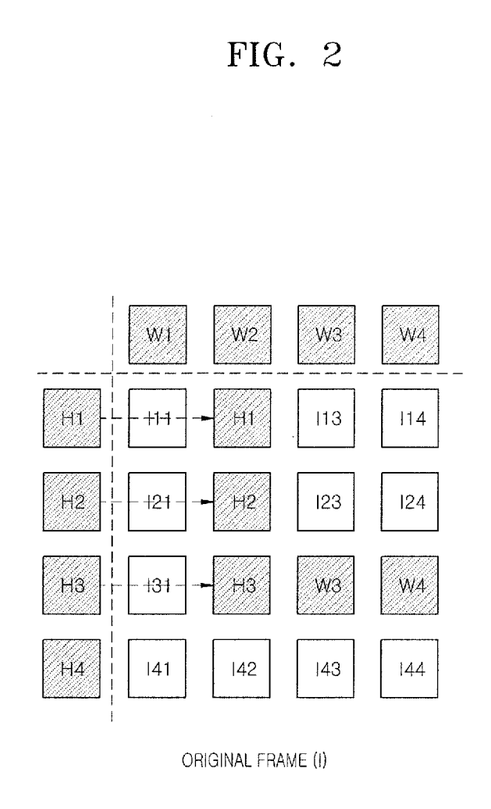
FIG. 2 is an exemplary diagram illustrating an intra-picture replication preprocessing scheme in an I frame in accordance with the present invention.

FIG. 2 is an exemplary diagram illustrating an intra-picture replication preprocessing scheme in an I frame in accordance with the present invention. An intra-picture replication preprocessing process in an I frame is described below with reference to FIG. 2.

An original frame I includes a plurality of macro blocks. In the I frame, an error value between blocks is calculated by comparing each of the macro blocks with all the macro blocks within the I frame. An error between two blocks is obtained using a Sum of Squared Error (SSE), that is, the sum of a square of the error of a pixel value that belongs to each block, and is defined as in Equation 1 below.

$$D_{b_i}(u, v) = \sum_{(x,y) \in b_i} (F_c(x, y) - F_R(x+u, y+v))^2 \quad \text{[Equation 1]}$$

In Equation 1, bi is the block of a current frame, Fc(x,y) is a pixel value at a current frame (x,y) position, $F_R$(x,y) is a pixel value at a reference frame (x,y) position, and u and v are motion vector values.

If the smallest SSE value of SSE values calculated by Equation 1 is smaller than a predefined threshold, the value of a corresponding reference block is replicated to an original block. A preprocessing process is completed by repeating the above process on all the blocks. In some embodiments, a Sum of Absolute Error (SAE), that is, the sum of the absolute values of the errors of a pixel value, may be used instead of the SSE value.

As shown in FIG. 2, W1 to W4 and H1 to H4 refer to blocks on which preprocessing has been performed through SSE calculation, and blocks I11 to I44 refer to blocks before the preprocessing. According to the above-described method, blocks I12, I22, and I32 are replicated to respective blocks H1, H2, and H3, and blocks I33 and I34 are replicated to respective blocks W3 and W4.

Figure 3:
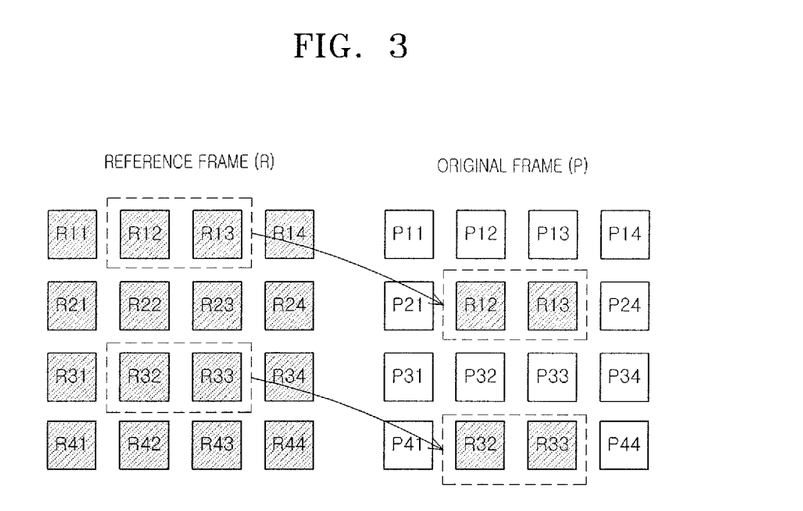
FIG. 3 is an exemplary diagram illustrating an inter-picture replication preprocessing scheme in a P frame in accordance with the present invention.

FIG. 3 is an exemplary diagram illustrating an inter-picture replication preprocessing scheme in a P frame in accordance with the present invention. An inter-picture replication preprocessing process in a P frame is described below with reference to FIG. 3.

In the P frame, a block value can be replicated from a reference frame R, such as an I frame or a P frame. In an original frame, SSE values are calculated by comparing each of macro blocks with all the macro blocks within a reference frame. If the SSE value of a block having the smallest SSE value, from among the macro blocks of the reference frame, is smaller than a preset threshold, the block value of the reference frame is replicated to an original block. A preprocessing process is completed by repeating the above process on all the blocks.

As shown in FIG. 3, the blocks R12 and R13 of a reference frame on which a preprocessing process has been performed are replicated to the respective blocks P22 and P23 of an original frame, and the blocks R32 and R33 of the reference frame on which a preprocessing process has been performed are replicated to the respective blocks P42 and P43 of the original frame.

Figure 4:
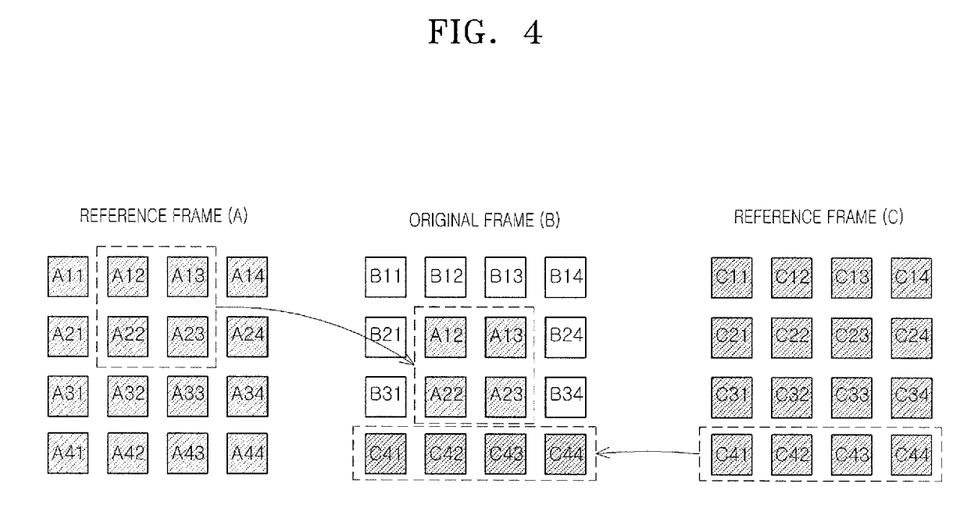
FIG. 4 is an exemplary diagram illustrating an inter-picture replication preprocessing scheme in a B frame in accordance with the present invention.

FIG. 4 is an exemplary diagram illustrating an inter-picture replication preprocessing scheme in a B frame in accordance with the present invention. An inter-picture replication preprocessing process in a B frame is described below with reference to FIG. 4.

The B frame can be obtained by replicating block values from the reference frames of the past A and future C in the time axis. SSE values are calculated by comparing each of macro blocks in an original frame B with all macro blocks within a reference frame A and a reference frame C. If the SSE value of a block having the smallest SSE value, from among the macro blocks of a reference frame, is smaller than a preset threshold, the block value of the reference frame is replicated to an original block.

As shown in FIG. 4, the blocks A12, A13, A22, and A23 of the reference frame A on which a preprocessing process has been performed are replicated to the respective blocks B22, B23, B32, and B33 of the original frame B, and the blocks C41 to C44 of the reference frame C are replicated to the respective blocks B41 to B44 of the original frame B.

Figure 5:
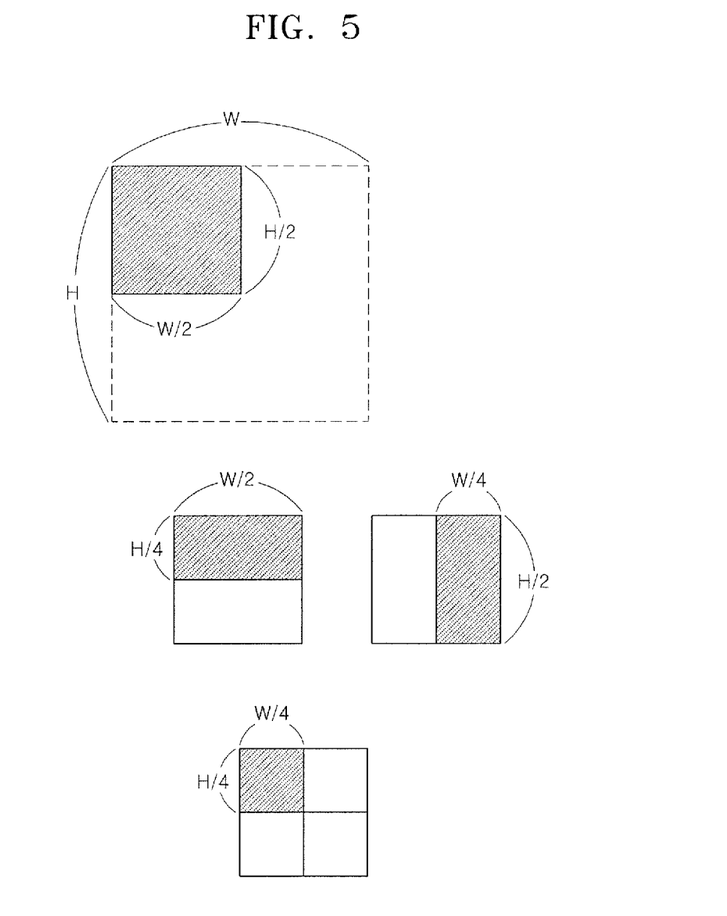
FIG. 5 is an exemplary diagram illustrating a variable size block error comparison flow according to a replication preprocessing scheme related to the present invention.

FIG. 5 is an exemplary diagram illustrating a variable size block error comparison flow according to a replication preprocessing scheme related to the present invention.

The replication preprocessing scheme of the present invention is performed for each block. In this scheme, as the block size is reduced, that is, the number of blocks increases, a comparison operation task increases, thereby increasing the encoding time. Accordingly, if replication is possible because there is much similarity between pixels, an SSE value is calculated by setting the block size as great as possible in order to minimize an encoding load.

As shown in FIG. 5, the size of a first block S0 is min (width, height)/2×min(width, height)/2. Here, the width indicates the number of horizontal pixels in a frame, and the height indicates the number of vertical pixels in the frame.

If a minimum SSE value using the size of the first block is smaller than a threshold, all the pixels that exist within the corresponding block size are replicated to the pixel values of a reference block. If the minimum SSE value is greater than the threshold, however, the block size is split by half horizontally or vertically and the above-described process is performed because all the pixels that exist within the corresponding block size cannot be replicated to the pixel values of a reference block. That is, the process is first performed using min(width, height)/4×min(width, height)/2, and the process is the performed using min(width, height)/2×min(width, height)/4.

If a minimum SSE value is greater than the threshold even in the split block size, each of the width and length of the size of the first block S0 is split by half and the process is performed. That is, the process is performed using min(width, height)/4×min(width, height)/4. The block split process continues to be repeatedly performed, and thus a minimum block size becomes 8×8. That is, if a minimum SSE value is smaller than the threshold or the block size is 8×8 during the process, the block split process is no longer performed.

Figure 6:
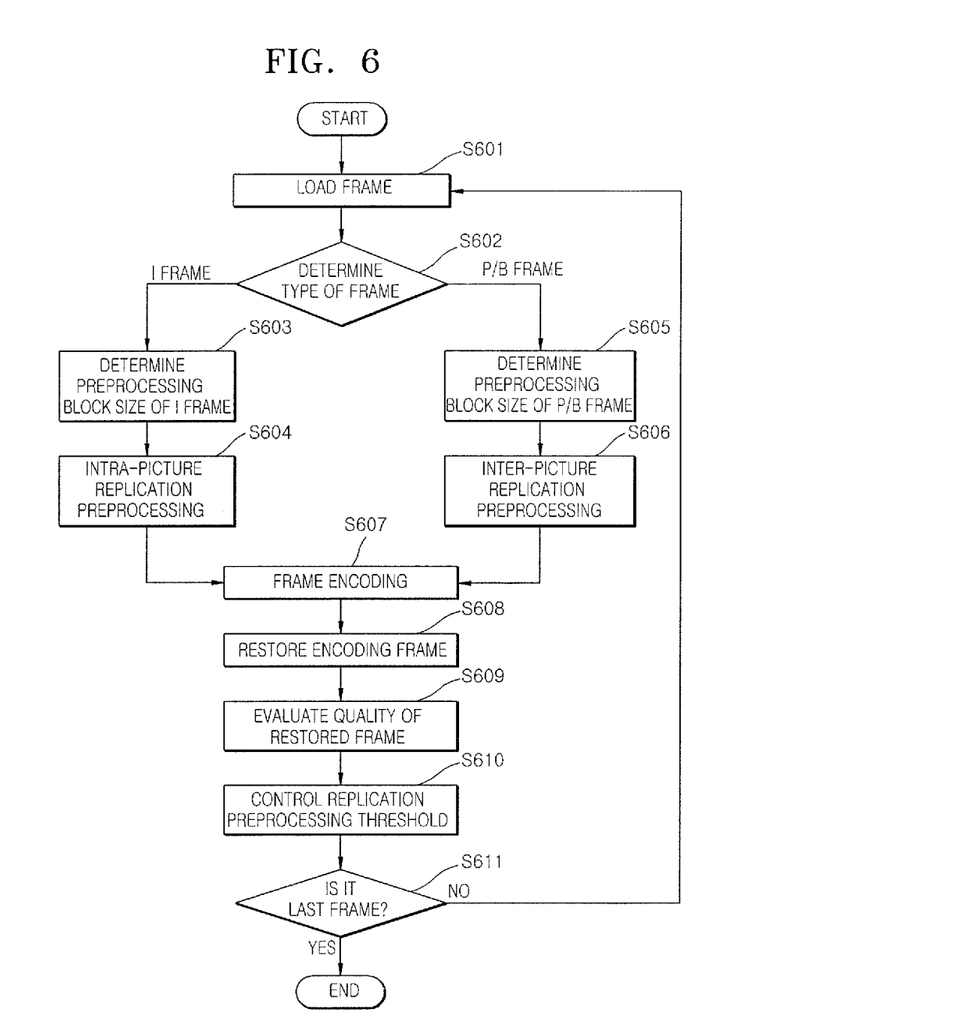
FIG. 6 is a flowchart illustrating an image encoding method using an adaptive preprocessing scheme in accordance with one embodiment of the present invention.

FIG. 6 is a flowchart illustrating an image encoding method using an adaptive preprocessing scheme in accordance with one embodiment of the present invention.

As shown in FIG. 6, first, a file of a YUV form (i.e., a brightness signal Y, a difference U between the brightness signal and a blue component, and a difference V between the brightness signal and a red component), that is, an input original image, is read in for each frame and then loaded at step S601.

The encoding type of the frame, that is, whether the frame will be encoded in an I frame or a P or B frame is determined at step S602.

If, as a result of the determination at step S602, it is determined that the frame will be encoded in the I frame, a minimum SSE value for the frame is calculated, the calculated SSE value is compared with a threshold, and a block size is determined based on a result of the comparison according to the variable size block error comparison flow at step S603. Next, an intra-picture replication preprocessing procedure is performed on blocks that can be replicated at step S604.

Meanwhile, if, as a result of the determination at step S602, it is determined that the frame will be encoded in the P or B frame, a minimum SSE value for the frame is calculated, the calculated SSE value is compared with a threshold, and a block size is determined based on a result of the comparison according to the variable size block error comparison flow at step S605. Next, an intra-picture replication preprocessing procedure is performed on blocks that can be replicated at step S606.

The frames on which the preprocessing process has been performed through replication as described above are encoded according to a common encoding procedure at step S607.

In the common encoding procedure, intra-picture prediction is performed on the I frame in order to remove information redundancy within an intra-picture space direction, a residual value of the I frame is calculated, and the I frame is encoded. There is a high probability that the block value of the replicated and preprocessed I frame will be replicated to a block value according to a result of the intra-picture prediction result and thus the residual value is reduced. Furthermore, in relation to the P and B frames, inter-picture prediction is performed in order to remove temporal information redundancy, motion compensation is determined, and residual values are calculated. There is a high probability that the block values of the replicated and preprocessed P and B frames will be replicated to a block value according to a result of the intra-picture prediction result and thus the residual values are reduced.

The encoded frames are restored in order to control the encoding rate adaptively depending on an encoder at step S608. Furthermore, the encoder evaluates whether the quality of the restored frames satisfies target quality based on a calculated Peak Signal-to-Noise Ratio (PSNR) and the bit rate of the encoded frame at step S609.

If the PSNR of a restored frame is low and thus quality is low, it means that picture quality has been deteriorated due to replication. Accordingly, the threshold, that is, a criterion for replication is upward controlled. In the opposite case (i.e., quality is satisfied), the threshold is maintained or downward controlled within a specific range at step S610.

Next, whether a frame outputted through the process is the last frame is checked at step S611. If, as a result of the check, it is determined that the frame outputted through the process is not the last frame, the process is repeatedly performed until the last frame of the input image. If, as a result of the check, it is determined that the frame outputted through the process is the last frame, the encoding process is terminated.

In accordance with the present invention, block value replication preprocessing is performed in an image encoding process. Accordingly, there is an advantage in that a compression ratio can be increased by reducing a residual value through intra-picture prediction and inter-picture prediction. Furthermore, the present invention is advantageous in that picture quality desired by a user can be maintained and compression efficiency can also be improved using an adaptive scheme for controlling a threshold, that is, a criterion for replication, based on a bit rate defined in an encoder and compression picture quality.

Furthermore, the present invention is advantageous in that utilization can be increased because the existing encoder is used without change using the preprocessing scheme and an encoded image can have the same format to which the existing decoding algorithm can be applied without additional algorithm processing in a decoder.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. An image encoding method using an adaptive preprocessing scheme, comprising:
    loading an input image for each frame;
    determining an encoding type of each of the frames;
    determining a size of a block to be encoded in each frame according to the determined encoding type;
    determining blocks that can be replicated from the blocks having the determined size and performing an intra-picture replication preprocessing or inter-picture replication preprocessing procedure on the determined blocks according to the encoding types of the frames; and
    encoding the frames on which the preprocessing procedure has been performed.

2. The image encoding method of claim 1, wherein the input image has a YUV form.

3. The image encoding method of claim 1, wherein the encoding type is any one of an I frame, a P frame, and a B frame.

4. The image encoding method of claim 1, wherein the determining of a size of a block to be encoded in each frame according to the determined encoding type comprises:
    a first process of comparing a Sum of Squared Error (SSE) value, calculated from a size of a first block, with a preset threshold;
    a second process of, if, as a result of the comparison, a minimum SSE value of the first block is greater than the preset threshold, comparing a minimum SSE value, obtained by splitting the size of the first block by half horizontally or vertically, with the preset threshold;

a third process of, if, as a result of the comparison in the second process, the minimum SSE value of the split block is greater than the preset threshold, comparing a minimum SSE value, obtained by splitting a size of the split block by half horizontally or vertically, with the preset threshold; and a fourth process of performing the first to third processes repeatedly until a minimum SSE value of the split block is smaller than the preset threshold or the size of the block becomes a minimum size of a block that can be split.

5. The image encoding method of claim 4, wherein the minimum size of the block is 8×8.

6. The image encoding method of claim 1, wherein the replication preprocessing procedure comprises calculating SSE values from all macro blocks within the frame to be encoded when the frame is an I frame and replicating a corresponding reference block value to an original block when a minimum SSE value of the calculated SSE values is smaller than a preset SSE threshold.

7. The image encoding method of claim 1, wherein the replication preprocessing procedure comprises calculating SSE values by comparing each macro block with all macro blocks within a reference frame when the frame to be encoded is a P or B frame and replicating a block value of the reference frame to an original block when an SSE value of a block having a minimum SSE value, from among all the macro blocks of the reference frame, is smaller than a preset SSE threshold.

8. The image encoding method of any one of claims 4, 6, and 7, wherein the SSE value is calculated by Equation below $$D_{b_i}(u, v) = \sum_{(x,y) \in b_i} (F_c(x, y) - F_R(x+u, y+v))^2,$$

wherein bi is the block of a current frame, Fc(x,y) is a pixel value at a current frame (x,y) position, $F_R$(x,y) is a pixel value at a reference frame (x,y) position, and u and v are motion vector values.

9. The image encoding method of claim 1, further comprising:
restoring the encoded frames and evaluating a quality of the restored frames; and
upward or downward controlling a threshold that is a criterion for determining blocks to be replicated based on the evaluated quality.

10. The image encoding method of claim 9, wherein the evaluating of a quality of the restored frames comprises evaluating whether the quality of the restored frames satisfies target quality of an encoder based on a result of a calculated Peak Signal-to-Noise Ratio (PSNR) and a bit rate of the encoded frame.

11. The image encoding method of claim 9, wherein the upward or downward controlling of the threshold comprises:
upward controlling the threshold when the quality of the restored frames is lower than the target quality, and
maintaining the threshold or downward controlling the threshold within a specific range when the quality of the restored frames satisfies the target quality.

* * * * *